Dec. 24, 1946.  F. D. BRADDON  2,412,961
AIRCRAFT ATTITUDE INDICATOR
Filed Nov. 13, 1941  2 Sheets-Sheet 1

INVENTOR,
FREDERICK D. BRADDON,
BY
Herbert H. Thompson
HIS ATTORNEY

Dec. 24, 1946.  F. D. BRADDON  2,412,961
AIRCRAFT ATTITUDE INDICATOR
Filed Nov. 13, 1941  2 Sheets-Sheet 2
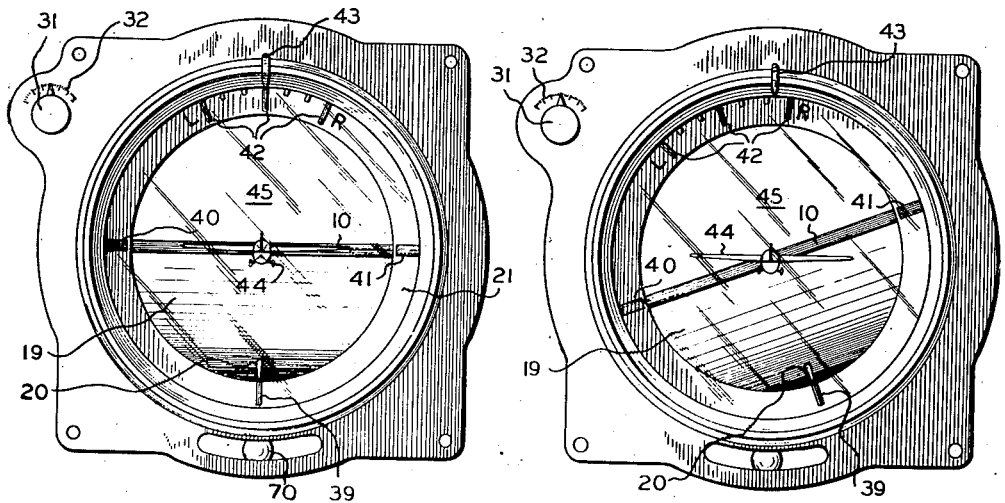
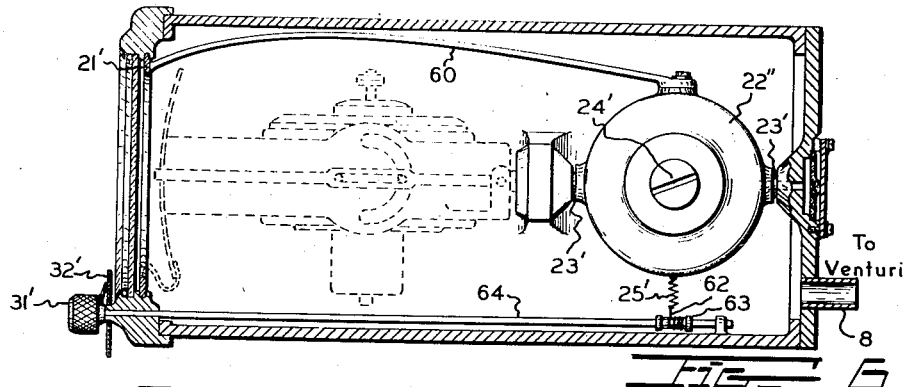
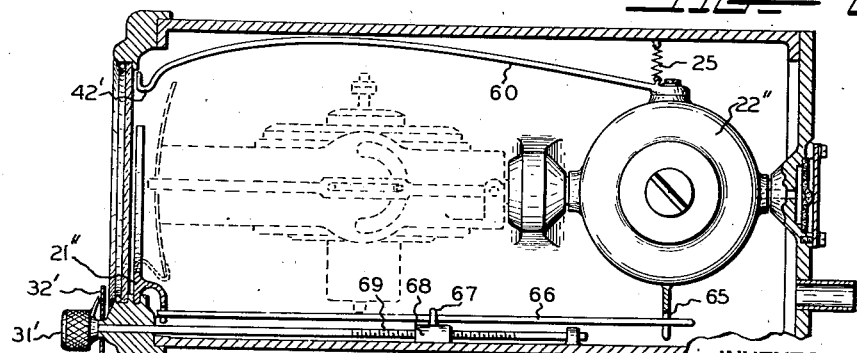
INVENTOR,
FREDERICK D. BRADDON,
BY
HIS ATTORNEY Patented Dec. 24, 1946

2,412,961

UNITED STATES PATENT OFFICE 2,412,961

AIRCRAFT ATTITUDE INDICATOR

Frederick D. Braddon, Babylon, N. Y., assignor to Sperry Gyroscope Company, Inc., Brooklyn, N. Y., a corporation of New York Application November 13, 1941, Serial No. 418,943

6 Claims. (Cl. 33—204)

This invention relates to gyroscopic artificial horizons or gyro-verticals primarily adapted for use to assist in navigating aircraft. As at present designed, the gyroscopic artificial horizon furnishes valuable information to the pilot during straight line flight in that it shows whether or not the aircraft is flying level. When turning, however, since the gyroscope remains horizontal, it will show the amount of bank but furnishes no indication as to whether or not the airplane is banked at the proper angle during a turn. In other words, it shows at all times the real vertical or horizontal and not the virtual vertical or horizontal. It is therefore necessary for the pilot to correlate the indications of the horizon with those of other instruments (such as a ball bank indicator) to properly control a turn.

The purpose of the present invention is to improve the gyroscopic horizon so that it may be used at all times to show whether the airplane is in the proper attitude both when flying straight and when turning, which condition is satisfied if the indicator may be made to show the virtual vertical during turns. For this purpose I propose to modify the horizon indicator of a gyroscopic artificial horizon by a correction factor proportional to the centrifugal force of the turn. This is preferably done by incorporating on the face of the horizon additional reference markings, or an index, which are displaced during a turn through an angle proportional to the centrifugal force (F). As F in turning, is proportional to both angular and linear speed ($F \alpha \omega v$), I propose to displace such index by means of a rate-of-turn gyroscope which measures "$\omega$" which is sufficient for a predetermined air speed but may be supplemented by an adjustment for other air speeds which is a measure of "$v$."

Referring to the drawings showing one form my invention may assume.

Fig. 4 is a front view of my device as seen on the instrument panel, as it would appear during straight level flight.

Fig. 5 is a similar view of the instrument as it would appear to the aviator during curved flight with the airplane banked at the proper angle.

Fig. 6 is a plan view, partly in section, similar to Fig. 1, of a modified form of the invention.

Fig. 7 is a similar view of a still further modification.

Figure 1:
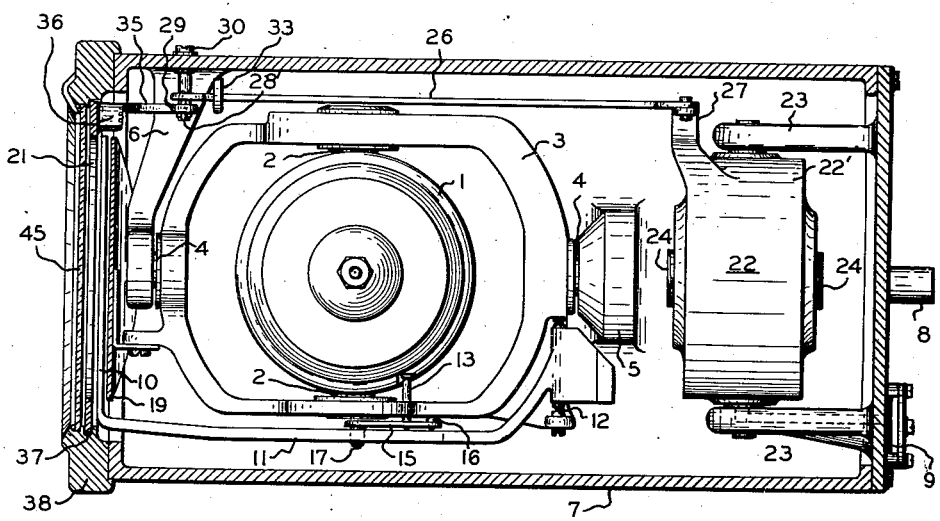
Fig. 1 is a plan view of my improved gyroscopic horizon with the outer case shown in section.
Figure 2:
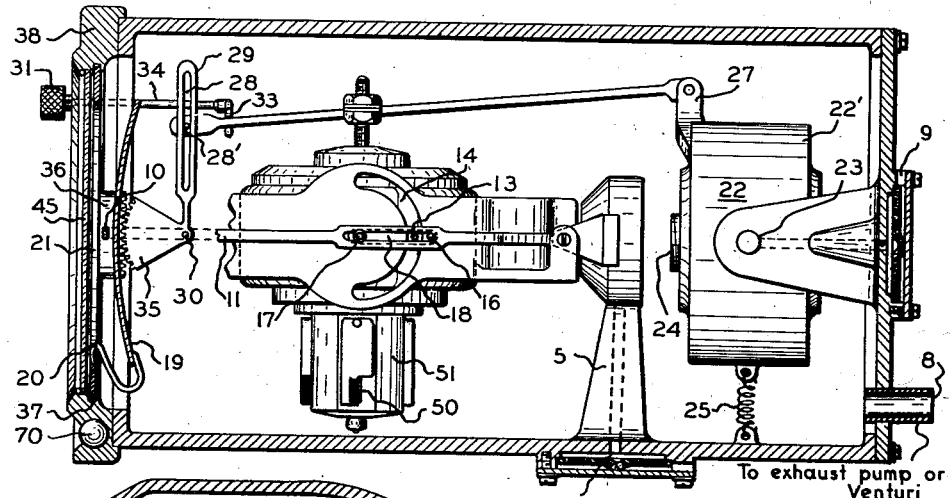
Fig. 2 is a side elevation of the same with the case in section.

I have illustrated the gyroscopic horizon as of usual form, comprising a rotor bearing casing 1 in which the rotor (not shown) is mounted for spinning about a vertical axis. Said casing is shown as pivoted on transverse axis 2—2 within a gimbal ring 3, which in turn is pivoted on a fore and aft axis 4—4 in brackets 5 and 6 secured within the outer enclosing casing 7. Air is usually employed to spin and erect the gyroscope, the outer casing 7 usually being evacuated through a suction pipe 8 and atmospheric air being admitted through apertures 9 connected with appropriate passages through the supports and trunnions to the rotor sinning jets (not shown) within the gyro casing. The used air is withdrawn from casing 1 through pendulum control apertures 50 in an extension 51 from the casing by which erection of the gyroscope is maintained.

The horizon indicator proper is shown in the form of a horizontal bar 10 at the face of the instrument usually read in connection with indices 40 and 41, the bar and indices forming a two part horizon indicator, which bar is secured to a long lever 11 pivoted at 12 on the gimbal ring 3, so that the bar is stabilized against rolling. Relative pitching of the gyroscope and craft imparts up and down motion to the bar by means of a pin 13 extending from the gyro case through a slot 14 in the gimbal ring, and thence to a multiplying lever 15 pivoted at one end 16 on the gimbal ring. At its other end, said lever is provided with a pin 17 engaging a horizontal slot 18 in the lever 11. The result is that the horizon bar moves in the same direction that the horizon appears to move upon pitching of the craft, as is common in the art. The bar may also be read by reference to a representation 44 of an aircraft on the front window 45. The face of the instrument is also provided with a convex mask 19 secured to the gimbal ring 3 so as to be stabilized against rolling. Said mark is usually provided with an index 20 at the top or bottom to show the amount of roll.

According to my invention, I place a movable index ring 21 on the face of the instrument, which is under the control of some means responsive to turn of the craft so as to displace the ring through an angle proportional to the centrifugal force. Since such force is proportional to $\omega v$, as above explained, I may turn such ring directly from a rate-of-turn gyroscope modified by the air speed of the craft. To this end I have shown a rate-of-turn type gyroscope 22, the rotor casing 22' of which is shown pivoted within the housing 7 on horizontal trunnions 23, the spin axis 24 of the enclosed rotor lying normally fore and aft. Said gyroscope is shown as centralized by spring 25 anchored to the casing 22'. With this arrangement when the craft yaws or turns about its vertical axis, the gyro 22 precesses on its horizontal axis in one direction or the other, depending upon the direction of turn of the craft through an angle proportional to the rate of turn.

Figure 3:
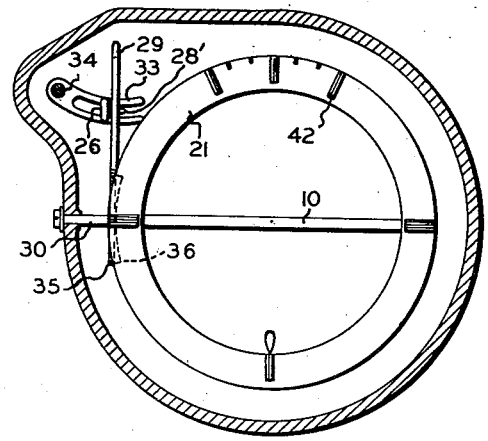
Fig. 3 is a front view of the same with the cover removed.

In order to introduce the linear velocity factor, such precessional movement of the gyroscope is shown as transferred to the ring 21 by means of a link 26 pivoted to a bracket 27 on the gyroscope and slidably connected at its forward end in a slot 28 in bell-crank lever 29 pivoted on casing 7 at 30. The distance of the pin 28' from the pivot 30 may be adjusted in accordance with the air speed either automatically or my hand as by means of a knob 31 and scale 32. Turning of the knob moves a fork 33 on the shaft 34 of said knob, said fork engaging the link 26 to lift or lower the free end thereof (see Fig. 3). The other leg of said bell-crank lever is shown as in the form of a gear sector 35, the teeth of which mesh with an annular crown gear sector 36 on the back of the ring 21, which is rotatably mounted in a groove 37 in bezel ring 38. When the craft turns, the gyroscope precesses to displace the ring through an angle proportional to the rate of the turn as modified by the air speed adjustment. Obviously, an approximate reading might be obtained without using this adjustment, merely by setting the device for the cruising or average air speed of the craft. Ring 21 is shown as provided with an index 39 which cooperates with the index 20 on the mask 19. The aforesaid indices 40 and 41 are also preferably placed on said ring so as to normally lie in line with the horizon bar 10 but the aircraft outline 44 is retained on the front window. Preferably, also, the ring is provided with angular markings 42 at the top thereof showing the direction and rate of turn (for any selected air speed), said markings being readable upon an index 43 secured to the bezel.

When flying a straight course, my improved horizon is used exactly the same as the present artificial horizon and its appearance remains substantially unaltered, but my improved horizon may also be used during turns since if the aircraft is banked correctly during the turn, the horizon bar will still be lined up with the reference markings 40, 41, and also the bank angle indication 20 will remain lined up with the reference mark 39, and the ball bank indicator 70 will remain centralized. On the other hand, the fact that the craft is banked will still be shown by the fact that the horizon bar is no longer parallel to the image of the aircraft 44. My improved indicator will also show the rate of turn for any selected airspeed by indications 42 and 43. In fact, this indicator really moves through an angle proportional to the centrifugal forces acting on the craft ($F \alpha \omega v$) so that it furnishes the aviator with a valuable check if dangerous acceleration forces are approached, thereby warning him to either reduce his air speed, or increase his radius of turn or both. The real attitude of the craft about its roll axis is observed by comparing the relative positions of the fixed representation 44 and the stabilized bar 10. The virtual attitude is observed by comparing the relative positions of the bar with the movable indices 40 and 41.

A somewhat simpler form of the invention is shown in Fig. 6. In this figure, the rate-of-turn gyroscope 22'' is mounted with its trunnion axis 23' fore and aft and with its spin axis 24' athwartships. In this case, the rotatably adjustable ring 21' is directly connected to the rate gyro casing by means of a long arm 60 connected to the top of said casing. In this instance, however, the air speed adjustment is made by varying the tension of the centralizing spring 25' connected to the gyroscope, the tension being increased inversely with air speed. For this purpose the outer end of the spring is shown as connected to a cord 62 wound on a spool 63 on a long shaft 64 journaled lengthwise of the casing and projecting through the forward end thereof to carry the adjusting knob 31', which is set in accordance with the air speed shown on indicator 32', the spring tension being varied inversely with air speed. It will be understood, of course, that the air speed may be set in automatically instead of manually, if desired.

A still further modification is shown in Fig. 7. In this figure, the adjustable ring 21'' is displaced in accordance with centrifugal force by being connected to a fork 65 on the bottom of the gyroscope 22'' through a long lever 66 which is pivoted between fork 67 on an adjustable nut 68, so that the pivot point may be adjusted longitudinally by rotating a threaded rod 69 from the air speed knob 31'. By this means, the ratio of movement of the gyro and the ring may be varied in accordance with air speed, somewhat similarly to the form shown in Fig. 1, the centralizing spring 25 in this instance being fixed to the casing.

In this case, also, I so construct the indicator 42' at the forward part of the instrument that it shows rate of turn instead of centrifugal force, so that the instrument may be used both as a rate of turn indicator and artificial horizon. For this purpose, the indicator 42' is directly connected to the top of the casing 22' by a long lever 60'. It will be understood that the indicator 42' may be merely an index movable on a scale on the bezel or it may be a short scale, as in Fig. 4, readable upon an index on the bezel. In this case, also, the ring 21'' is preferably truncated so as not to interfere with the index 42'.

Still another method of introducing the air speed factor is by varying the speed of rotation of the rate gyro rotor in accordance with air speed instead of by varying the linkage connection or spring stiffness. This may readily be done without any further apparatus than shown in any one of the preceding figures by connecting the suction outlet 8 in each case to a Venturi tube in the air stream, which is designed to give a suction proportional to air speed. When this is done, it is obvious that the adjustment for air speed otherwise made by knob 31 or knob 31', as the case may be left untouched for moderate variations in air speed which would result in comparable changes in rotor speed, but for larger speed changes, some adjustment of knob 31 or 31' would probably be necessary since rotor speed does not continue to vary as a direct function of the pressure at the nozzle as the rotor speed becomes great.

I am aware that this method involves also a change in the rotor speed of, and velocity of air exhaust from, the horizon gyro, but this is not a serious disadvantage since the erection rate will not be materially affected, as both the rotor speed and force of the air jets will vary at about the same proportion, and therefore the rate of erection will remain substantially unchanged.

While I have apparently described a number of forms of the invention, the forms are closely related. Thus, the form of the invention shown in Fig. 6, in which the tension of the centralizing spring is varied inversely with air speed, and the form of the invention described in which the air speed factor is introduced through varying the rotor speed, are both species of the same broad principle of introducing the air speed factor by varying with air speed the extent of precession that occurs during a turn at any given rate, since the extent of precession varies inversely with the spring tension and directly with the rotor speed. Also, the idea of showing rate of turn indications on the face of the instrument, although only shown in Fig. 7, is readily applicable to the forms shown in Figs. 1 to 5, as will be readily apparent.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. An attitude indicating instrument for aircraft including a gyroscopic artificial horizon having a normally horizontal index member controlled thereby, a rate of turn gyroscope, a reference member for the horizon index member comprising a movable ring having diametrically opposite normally horizontal reference positions thereon, and means for moving said ring under control of the rate of turn gyroscope.

2. An attitude indicating instrument for aircraft including a gyroscopic artificial horizon having a normally horizontal index member controlled thereby, a reference member for the horizon index member comprising a movable ring having diametrically opposite normally horizontal reference positions thereon, a device responsive to turn of the aircraft about its vertical axis, and means operatively connecting said ring and said device.

3. In a gyroscopic artificial horizon for dirigible craft, a gyro-vertical, an index stabilized therefrom, a stationary reference member readable with said index indicating the real attitude of the craft about its roll axis, a movable reference member readable with said index indicating the virtual attitude of the craft about its roll axis during turns, a device responsive to rate of turn of the craft about its vertical axis for controlling said movable reference member, and means for adjusting said device in accordance with the air speed of the craft.

4. An attitude, proper bank angle and rate of turn indicating instrument for aircraft comprising an artificial horizon having an index controlled thereby, rotatable about a horizontal fore-and-aft axis, a fixed index member, a member having separate reference indications thereon, said member being rotatable about said axis, one of said indications being readable with the index member controlled by the artificial horizon to provide an indication of the virtual attitude of the aircraft about its roll axis during turns, and the other of said reference indications being readable with the fixed index member to provide an indication of the rate of turn of the craft about its vertical axis, and a device responsive to the rate of turn of the craft about its vertical axis operatively connected to rotate said rotatable member.

5. An instrument as claimed in claim 4, including a stationary reference member for the index controlled by the artificial horizon, the same providing an indication of the real attitude of the aircraft about its roll axis.

6. An instrument for indicating the real and virtual attitude of a craft about its roll axis during turns comprising a gyroscopic artificial horizon having a casing with a fixed reference member thereon and a horizon index rotatable relative to the reference member about a fore-and-aft axis and readable therewith to indicate the real attitude of the craft, a second reference member mounted on said casing to turn relative to said horizon index about said axis and readable therewith to indicate the virtual attitude of the craft, a device responsive to the rate of turn of the craft in azimuth connected to said second reference member to turn it about said axis.

FREDERICK D. BRADDON.